United States Patent [19]

Seiders

[11] 4,315,606
[45] Feb. 16, 1982

[54] FISHING ROD EYE TYING DEVICE

[76] Inventor: Roger S. Seiders, 12102 Cathy Dr., Houston, Tex. 77065

[21] Appl. No.: 111,392

[22] Filed: Jan. 11, 1980

[51] Int. Cl.³ .............................................. B65H 81/02
[52] U.S. Cl. ........................................ 242/7.19; 242/47
[58] Field of Search ................... 242/7.19, 7.21, 7.22, 242/7.23, 7.09, 47; 57/11

[56] References Cited

U.S. PATENT DOCUMENTS

| 704,550 | 7/1902 | Kreidler | 57/11 |
| 2,218,995 | 10/1940 | Torrence | 242/7.19 |
| 2,550,131 | 4/1951 | Wodetzky | 242/7.19 |
| 2,556,827 | 6/1951 | Striano | 242/7.19 |
| 2,640,653 | 6/1953 | Wodetzky | 242/7.19 |

Primary Examiner—Billy S. Taylor
Attorney, Agent, or Firm—Ranseler O. Wyatt

[57] ABSTRACT

A device for tying eyes on fishing rods having a base member for receiving a plurality of adjustable rod holding members, and a rotating motor mountable on one end of said base member for rotating a rod held by the rod holding member and a shuttle for guiding the line to be wound on the rod in tying the eye in place, and a tension means for maintaining a tension on the line as it is being wound on the rod to provide a tight, neat tie.

6 Claims, 4 Drawing Figures

U.S. Patent
Feb. 16, 1982
4,315,606
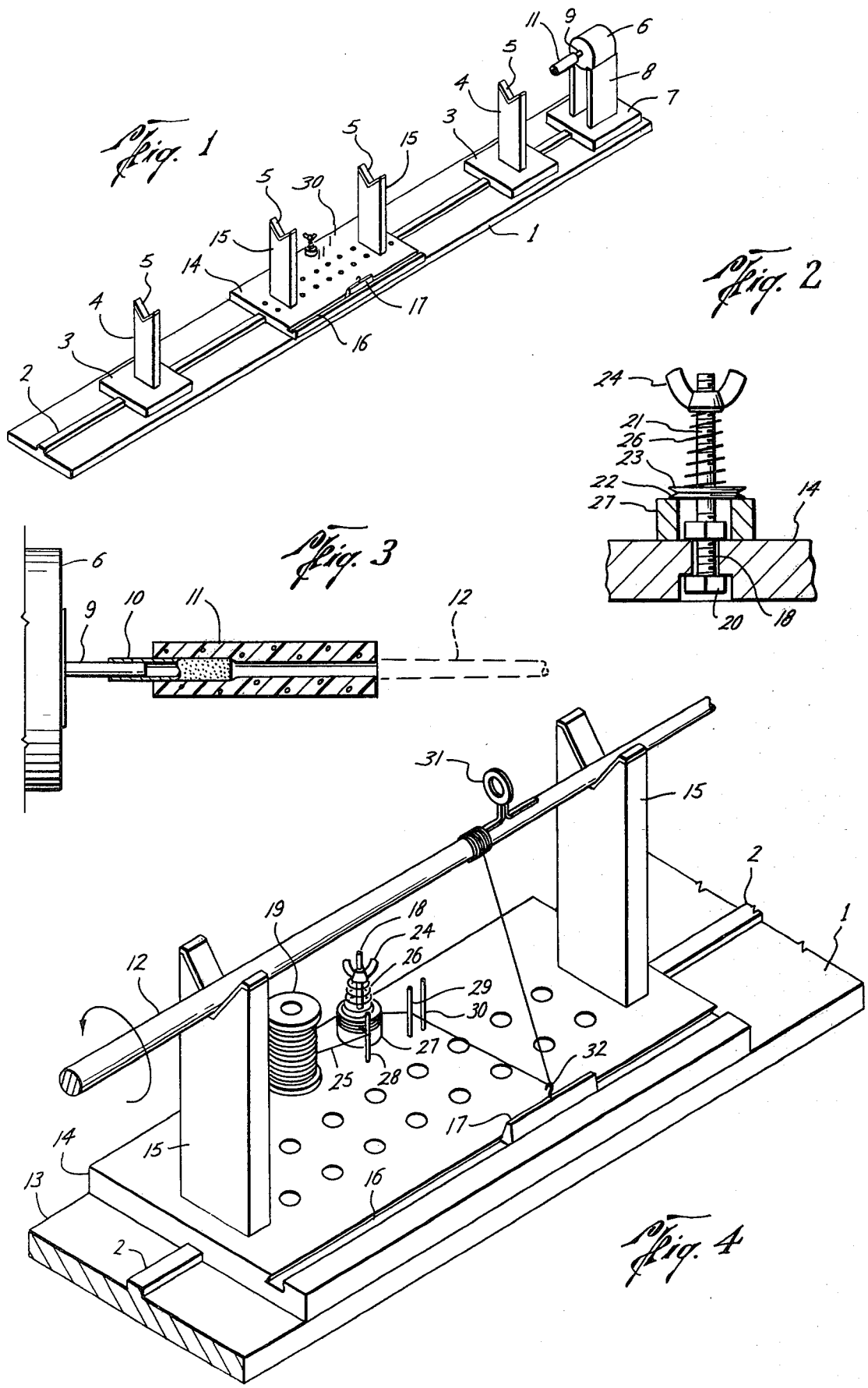

FISHING ROD EYE TYING DEVICE

BACKGROUND OF THE INVENTION

In rod building, tying eyes on the rod is the hardest and most exacting step, requiring patience and skill to wind the thread on the rod tightly and neatly, and is now performed by hand, which is most time consuming. It is an object of this invention to provide a means for rotating a rod on which eyes are to be tied, and having means for guiding the thread and maintaining the desired tension thereon as the rod rotates.

SUMMARY OF THE INVENTION

An eye tying device for use in building fishing rods, and the like, wherein a base member is provided with a rod rotating device and a plurality of rod holding members, adjustable longitudinally on said base, and a thread holding member longitudinally adjustable on said base member, having a longitudinally movable shuttle to guide the thread as the rod rotates and an adjustable tension maintaining means for maintaining the preselected tension on the thread as the rod rotates.

BRIEF DESCRIPTION OF THE DRAWING

FIG. 1 is an elevational perspective view of the assembled device.

FIG. 2 is an enlarged, cross sectional view of the tension maintaining device.

FIG. 3 is a side elevational, cross sectional view of the means for receiving one end of the rod by the rotating device.

FIG. 4 is an enlarged elevational perspective view of the thread holding device, showing the longitudinally movable shuttle for guiding the thread as the rod rotates.

DESCRIPTION OF THE PREFERRED EMBODIMENTS

In the drawings, the numeral 1 designates a base member which is an elongated strip of rigid material having a raised track 2 midway of the side margins thereof, and extending longitudinally the length of the base member. If desired, additional base members (not shown) may be aligned with the member 1 for longer rods. Rod supporting members having a base 3 and an upstanding member 4 is mounted on the base member 3 with its extended forming a rod holding seat, the outer face of the seat having a protective covering, as felt, 5.

A motor 6 is mounted on the motor holder which consists of the base member 7 and supports 8, 8. The drive shaft 9 of the motor has a rigid cylinder 10 mounted thereon and extending outwardly therefrom, and a flexible cylinder 11 is mounted at one end on the rigid cylinder 10, and a rod, 12, is mounted in the other end of the cylinder 11, the cylinder stretching to receive rods of various sizes. Each of the base members 3, 7 and the base member 13 of the thread holding member, has a longitudinal slot in the bottom surface thereof to receive the track 2.

The thread holding member 14 has a pair of rod supporting members 15, 15 which have downwardly extending pegs (not shown) to be selectively mounted in one of the series of spaced pairs of holes in the thread supporting member 14, and a longitudinal groove 16 is formed in the face of the threaded supporting member 15 in which a shuttle 17 is mounted to be selectively movable longitudinally therein. A spool post 30 is mounted on the thread supporting member 14 to receive a spool of thread 19, this post is mounted in the base of the member 14 and extends upwardly therefrom. A tension post 18 is mounted in the base member 14, the head thereof being countersunk into the base member's lowermost face, and having its upper portion externally threaded as at 21. A pair of concave-convex washers 22, 23 are mounted on the post 18, with the convex surface of each bearing against each other, and a spring 26 is mounted on the post, one end bearing against said washers and the upper end of said spring 26 bearing against the wing nut 24 mounted on the post. The spring is tapered upwardly, and as the thread 25 is mounted on the tension device, it extends between the said washers 23, 24 and the desired tension is applied to means of the wing nut 24. A cylindrical, rigid support 27 is mounted on the post 18 to form a base member for the washers 22, 24, and elevate the washers 22, 23 from the base members of the thread supporting member. Posts 28, 29 30 are upstanding on said thread supporting member as guides for the thread being wound on the rod 12.

A rod on which eyes, as 31, are to be mounted, is placed in the seats of the supporting members 4, 4, said members being positioned as desired by moving same along the track 12, to adequately support the particular rod, and the thread supporting means is moved on the track 12 to a position centering the tension device beneath the location of the eye to be tied. A speed operated foot control (not shown) of the type commonly in use for variable speed control, is employed to select the speed of the motor 6, and the flexible cylinder 11 permits easy movement of the rod off and on the seats, if desired. The spool of thread 19 is then mounted on the thread post 30 and the thread passed around the post 28 and between the washers 22,23, then around the post 29, through the hook 32 on the shuttle 11, and a few turns are taken around the rod at the point of the tie for the purpose of anchoring the one end of the thread, and the rod is then rotated and the shuttle 17 moved longitudinally in the slot 16, to direct the wrapping of the thread, making a tight, neat bed for the eye 31. When this wrap is formed, the eye 31 is glued on said bed of thread, or the rod itself, and the thread again wrapped a few turns around the rod and the rod then rotated to form a tight, neat wrap over the rod adjacent each leg of the eye and over each leg, first on one side, then on the other, and the thread is tight, closely wrapped and neat, and is then tied off in the usual manner and the tie is complete.

The supporting members 4 are readily positioned on the base member 13, grooves in the bottom of the supports receiving the track 12, allowing the supports to be positioned to provide the proper seating of the rod. The thread supporting member is similarly movable to a position beneath the location for the eye to be tied. The adjustable tension means to maintain the desired tension on the thread leaves both hands of the operator free in effecting the tie. The nut 33 cooperating with the bolt head 20, maintains tke bolt 21 securely in vertical position on the base member 14.

What I claimed is:

1. In a device for tying eyes on a fishing rod, a base member, a track longitudinally mounted on said base member, central rod supporting means, a longitudinal slot for slidably receiving the track of the base member, a rod rotating means on said base member and longitudinally adjustable outside rod supports in horizontal alignment with said rotating means mounted on said base member, thread supporting means on said central rod supporting means having a tension device for maintaining tension on thread to be applied to a rod, said central rod supporting means further having a groove, and a shuttle mounted in said groove on said thread supporting means for guiding said thread as it is wound on the rod.

2. The device defined in claim 1 wherein said base member is elongated, having side margins and said track extending longitudinally thereof and each of said rod supporting members having a slot in the bottom surface to receive said track and permit selective longitudinal positioning of the various supporting members.

3. The device defined in claim 1 wherein the groove of said central rod supporting means is in the form of dove-tailed groove extending longitudinally adjacent one margin in which the said shuttle travels, said shuttle having a thread guide through which thread passes as the shuttle is moved longitudinally in the groove directing a level wind in applying the thread to a rod.

4. The device defined in claim 1 wherein said central rod supporting means has rod supporting members mounted thereon and a series of ports in an upper surface thereof for selectively positioning said rod supports.

5. The device defined in claim 1 wherein said tension device comprises an upstanding post mounted in said central rod supporting means having its upper outside area and its lower outside area threaded, a pair of concave-convex washers mounted on the upper outside area of said post with the convex portions abutting, and a spring on said post bearing at one end against said washers and a wing nut movably mounted on the extended end of said post to bear against and compress said spring.

6. The device defined in claim 1 wherein said rotating means consists of a motor having a drive shaft, a rigid cylinder mounted at one end on said drive shaft and a flexible cylinder mounted on the other end of said rigid cylinder, the extended end of said flexible cylinder being expandable to receive one end of the rod on which eyes are to be tied.

* * * * *